United States Patent
Kapadia et al.

(10) Patent No.: US 10,093,304 B2
(45) Date of Patent: Oct. 9, 2018

(54) ENHANCED ELECTRIC DRIVE MODE HAVING PREDICTED DESTINATIONS TO REDUCE ENGINE STARTS

(71) Applicant: Ford Global Technologies, LLC, Dearborn, MI (US)

(72) Inventors: Jimmy Kapadia, Ottawa Hills, OH (US); Kenneth James Miller, Canton, MI (US); Kenneth Frederick, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 14/851,723

(22) Filed: Sep. 11, 2015

(65) Prior Publication Data

US 2017/0072937 A1    Mar. 16, 2017

(51) Int. Cl.
| | | |
|---|---|---|
| *B60W 20/12* | (2016.01) | |
| *B60W 10/06* | (2006.01) | |
| *B60W 10/08* | (2006.01) | |
| *B60W 50/00* | (2006.01) | |
| *B60W 20/20* | (2016.01) | |

(52) U.S. Cl.
CPC ............ *B60W 20/12* (2016.01); *B60W 10/06* (2013.01); *B60W 10/08* (2013.01); *B60W 20/20* (2013.01); *B60W 50/0097* (2013.01); *B60W 2050/0078* (2013.01); *B60W 2050/0089* (2013.01); *B60W 2510/244* (2013.01); *B60W 2550/402* (2013.01); *B60Y 2200/92* (2013.01); *Y02T 10/6291* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 8,040,083 | B2* | 10/2011 | Okamura | H02P 29/032 318/139 |
| 8,073,605 | B2 | 12/2011 | Naik et al. | |
| 8,527,122 | B2 | 9/2013 | Yamada et al. | |
| 8,676,495 | B2 | 3/2014 | Miura et al. | |
| 8,694,218 | B2* | 4/2014 | Shultz | F16H 61/0213 477/110 |
| 8,942,919 | B2 | 1/2015 | Uyeki et al. | |
| 9,046,175 | B2* | 6/2015 | Shultz | F16H 61/68 |
| 9,403,532 | B2* | 8/2016 | Conn | B60W 10/02 |
| 9,533,677 | B2* | 1/2017 | Nefcy | B60W 20/30 |
| 9,738,274 | B2* | 8/2017 | Mitsutani | B60W 20/50 |

(Continued)

FOREIGN PATENT DOCUMENTS

WO    WO 2006090249 A1 *   8/2006

*Primary Examiner* — Jean Paul Cass
(74) *Attorney, Agent, or Firm* — David Kelley; Brooks Kushman P.C.

(57) ABSTRACT

A system and method for controlling a vehicle includes controlling a vehicle according to a first mode in response to a calculated likelihood exceeding a threshold likelihood, and controlling the vehicle according to a second mode otherwise. The calculated likelihood corresponds to the likelihood that the vehicle is within a threshold distance of a current drive cycle final destination. The calculated likelihood is derived from geolocation data collected from geolocation systems in at least one vehicle across a plurality of vehicle drive cycles.

14 Claims, 4 Drawing Sheets

(56) References Cited

U.S. PATENT DOCUMENTS

| | | | |
|---|---|---|---|
| 2008/0029318 A1* | 2/2008 | Proietty | B60K 6/48 180/65.265 |
| 2008/0033620 A1* | 2/2008 | Kamichi | B60K 6/445 701/59 |
| 2009/0192655 A1* | 7/2009 | Ichikawa | B60L 11/1811 700/291 |
| 2010/0188043 A1* | 7/2010 | Kelty | B60L 3/0046 320/109 |
| 2010/0250037 A1* | 9/2010 | Yoshida | B60K 6/365 701/22 |
| 2010/0280687 A1* | 11/2010 | Tate, Jr. | B60W 10/06 701/22 |
| 2011/0172867 A1* | 7/2011 | Yu | B60K 6/445 701/22 |
| 2012/0095670 A1 | 4/2012 | Piggott | |
| 2012/0208672 A1* | 8/2012 | Sujan | B60W 10/02 477/5 |
| 2013/0218724 A1* | 8/2013 | Moretti | G06Q 50/30 705/26.63 |
| 2014/0094998 A1* | 4/2014 | Cooper | B61L 3/006 701/2 |
| 2015/0039391 A1* | 2/2015 | Hershkovitz | G06Q 10/04 705/7.31 |
| 2016/0059845 A1* | 3/2016 | Nefcy | B60W 20/30 477/115 |
| 2016/0264124 A1* | 9/2016 | Hotta | B60K 6/445 |
| 2016/0301116 A1* | 10/2016 | Ochiai | H01M 10/0525 |

\* cited by examiner

ENHANCED ELECTRIC DRIVE MODE HAVING PREDICTED DESTINATIONS TO REDUCE ENGINE STARTS

TECHNICAL FIELD

The present disclosure relates to hybrid electric vehicles having an electric-only drive mode and to a method of controlling operation of such vehicles.

BACKGROUND

Hybrid electric vehicles (HEVs) include engines that may be stopped and started while the vehicle is in motion. When the engine is stopped while the vehicle is in motion, the hybrid vehicle may operate in an "electric only" mode. A controller may issue stop (or "pull down") or start (or "pull up") commands to the engine in response to various conditions including a reduced battery state of charge. Plug-in hybrid electric vehicles (PHEVs) are generally equipped with larger batteries and may travel longer distances than other HEVs in electric only mode.

SUMMARY

A system and method for controlling a vehicle according to the present disclosure includes controlling a vehicle according to a first mode in response to a calculated likelihood exceeding a threshold likelihood, and controlling the vehicle according to a second mode otherwise. The calculated likelihood corresponds to the likelihood that the vehicle is within a threshold distance of a current drive cycle final destination. The calculated likelihood is derived from geolocation data collected from geolocation systems in at least one vehicle across a plurality of vehicle drive cycles.

Other embodiments of this aspect include corresponding computer systems, apparatus, and computer programs recorded on one or more computer storage devices, each configured to perform the actions of the methods.

According to some embodiments, the first mode includes an electric-only operating mode having a first engine-start threshold associated with a parameter, and the second mode includes an electric-only operating mode having a second engine-start threshold associated with the parameter. The first engine-start threshold is different from the second engine-start threshold.

In such embodiments, the parameter may include a driver power request, with the first engine-start threshold being greater than the second engine-start threshold. The parameter may also include a temperature of an engine component, with the first engine-start threshold being less than the second engine-start threshold.

According to some embodiments, the method additionally includes identifying a set of drive cycles among the plurality of drive cycles based on a current vehicle location to calculate the likelihood. The geolocation data for the respective drive cycles of the set of drive cycles corresponds to the current vehicle location. The method further includes determining a proportion of drive cycles among the set of drive cycles for which the drive cycle reached a final destination within the threshold distance.

According to various additional embodiments, the method additionally includes includes a modification factor for calculating the likelihood. The modification factor may be based on a starting location for the current drive cycle, a proximity to an electric vehicle charging station, and/or a vehicle destination being set in a vehicle navigation system.

A vehicle according to the present disclosure includes an electric drive system with a traction battery. The vehicle also includes an internal combustion engine. The vehicle additionally includes a controller. The controller is configured to calculate a likelihood that a vehicle is within a threshold distance of a final destination for a current drive cycle based on geolocation data collected from geolocation sensors in at least one vehicle across a plurality of vehicle drive cycles. The controller is further configured to control the vehicle according to an electric-only mode having a first engine-start threshold associated with a parameter in response to the calculated likelihood exceeding a threshold likelihood, and control the vehicle according to an electric-only mode having a second engine-start threshold associated with the parameter in response to the calculated likelihood not exceeding the threshold likelihood.

A method of controlling a vehicle according to the present disclosure includes modifying an engine-start threshold associated with a vehicle sensor reading. The modifying of the threshold is in response to an electric drive mode being active and a calculated likelihood that the vehicle is within a threshold distance of a final destination for a current drive cycle based on data collected from least one vehicle across a plurality of drive cycles.

Embodiments according to the present disclosure provide a number of advantages. For example, the present disclosure provides a hybrid vehicle that may maintain electric-only mode operation and avoid engine starts while nearing a final destination for a drive cycle, even when the final destination is not a frequent destination for the vehicle.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
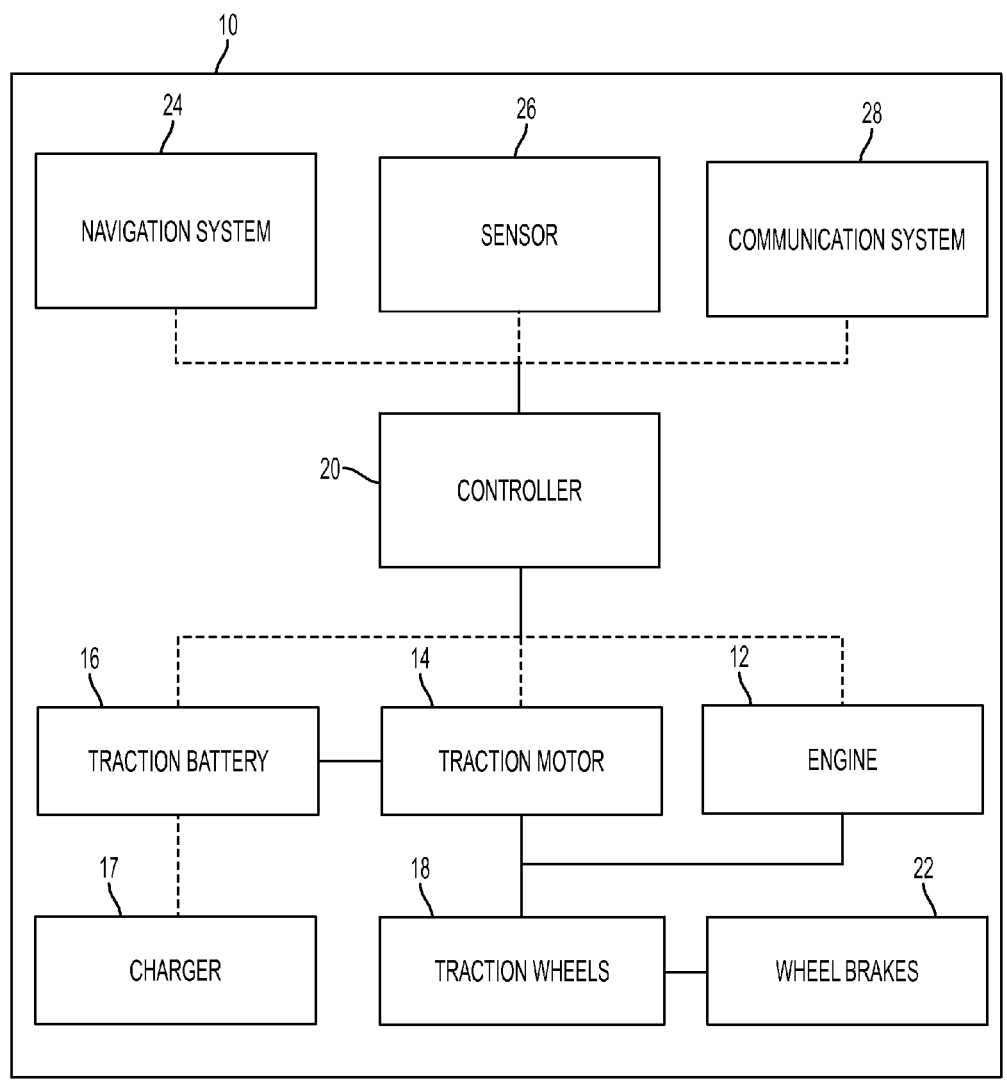
FIG. 1 is a schematic representation of a vehicle according to an embodiment of the present disclosure.

Referring now to FIG. 1, the powertrain of a PHEV 10 includes an engine 12, at least one electric motor/generator 14, a traction battery 16, and a charger 17. The charger 17 is adapted to electrically couple to an external electric power source and recharge the traction battery 16. The engine 12 and the motor/generator 14 are each provided with torque transmission paths to vehicle traction wheels 18. The engine can also charge the traction battery 16 through the motor/generator 14.

The engine 12, motor/generator 14, and traction battery 16 are all in communication with or under the control of at least one controller 20. The controller 20 may be a vehicle systems controller, a combination of an engine system controller and a battery system controller, or other controllers as appropriate.

Vehicle kinetic energy may also be recovered and regenerated using wheel brakes 22 to drive the motor/generator and recharge the battery. The PHEV 10 further includes an externally-accessible electrical interface (not shown) for plugging into a charging station.

The PHEV 10 additionally includes a navigation system 24, such as a GPS system. The navigation system 24 is in communication with or under the control of controller 20. The navigation system may be an installed in-vehicle navigation system or a standalone navigation system, such as a portable GPS or a navigation-equipped mobile device, that is in communication with the controller 20.

The PHEV 10 further includes at least one sensor 26 configured to measure a vehicle parameter. As non-limiting examples, the sensor 26 may include an accelerator pedal sensor configured to detect an accelerator pedal position, a temperature sensor configured to measure a temperature of an engine component, or a temperature sensor configured to measure a temperature of an engine fluid. The sensor 26 may also include other sensors known in the art. The sensor 26 is in communication with or under the control of the controller 20.

The controller 20 is configured to transmit data from the navigation system 24 to a remote processing center via a communications system 28. The communications system 28 is preferably a wireless communications system using cellular data, but may include various other wireless transmission systems, such as Bluetooth® or Wi-Fi™, or a wired connection. The controller 20 may be configured to send the sensor data in real-time or to store the data for a period and subsequently transmit the stored data. In various embodiments, the controller may be configured to transmit sensor data on a daily basis or after each drive cycle.

Other embodiments may include various other sensors that capture vehicle or driver behavior, such as an accelerometer or a speedometer, in communication with the controller 20. Such sensors provide additional information based on which trip data may be inferred. In such embodiments, the controller 20 may be further configured to send sensor data from these sensors at various intervals as discussed above.

In a preferred embodiment, the data transmission occurs only after a driver "opts in," or agrees to the data transmission after being informed of the type of data that will be collected. This may be performed via a user interface, such as a touch-enabled display, upon the first or subsequent use of the vehicle.

Hybrid vehicles, including PHEVs, may operate in three general categories of operation modes with respect to energy management and battery SOC: charge sustaining, charge depletion, and charge elevation. In a charge sustaining mode, the PHEV is controlled to maintain the battery SOC in the vicinity of an SOC threshold. This threshold may be referred to as a battery charge sustaining level. As a non-limiting example, a default battery charge sustaining level may be set at approximately 30% battery SOC. In a charge depletion control mode, battery electricity is consumed to power the electric drive system, such that the battery SOC decreases over a given driving distance. In a charge elevation control mode, fuel energy is converted into battery electricity by the powertrain, such that the battery SOC increases over a given driving distance.

The PHEV 10 is configured to operate in an "electric-only" mode, a type of charge depletion control mode. In this mode, the engine 12 is stopped. The motor/generator 14 provides torque to the traction wheels 18 using stored electric energy from the traction battery 16. In electric only mode, regenerative braking is still available to recover kinetic energy as stored electric energy. To avoid over-depleting the traction battery 16, a battery state of charge threshold is provided. If the battery state of charge falls below the threshold, then the engine 12 will be started in order to sustain the battery SOC in a charge sustaining mode or to charge the traction battery 16. The engine 12 may be started in response to a command from controller 20 or other controllers as appropriate.

HEVs and PHEVs are generally configured to operate among the various modes to maximize fuel economy. However, drivers of HEVs and PHEVs generally perceive electric-only operation to be most efficient and thus prefer that the vehicle operate in electric-only mode as often and as long as possible.

When a vehicle controller has learned or otherwise knows a final vehicle destination for a current drive cycle, the vehicle controller may optimize vehicle operation to provide electric-only operation through the current drive cycle. Final destinations for drive cycles may be known or learned, for example, from repeated driving cycles to frequent destinations or from driver designation of a final location via a navigation system. However, many vehicle driving cycles do not have final destinations that are known or learned by the controller. For example, drive cycles ending at a store, restaurant, or at a friend or relative's home may not have known or learned final destinations. Such drive cycles may have familiar routes so that a driver does not designate the location in the navigations system, and the destination may not be frequent enough to result in the controller learning the destination. As a result, during such drive cycles the vehicle engine may be started, e.g. due to low battery state of charge, near the end of the drive cycle. This may result in decreased customer satisfaction.

Figure 2:
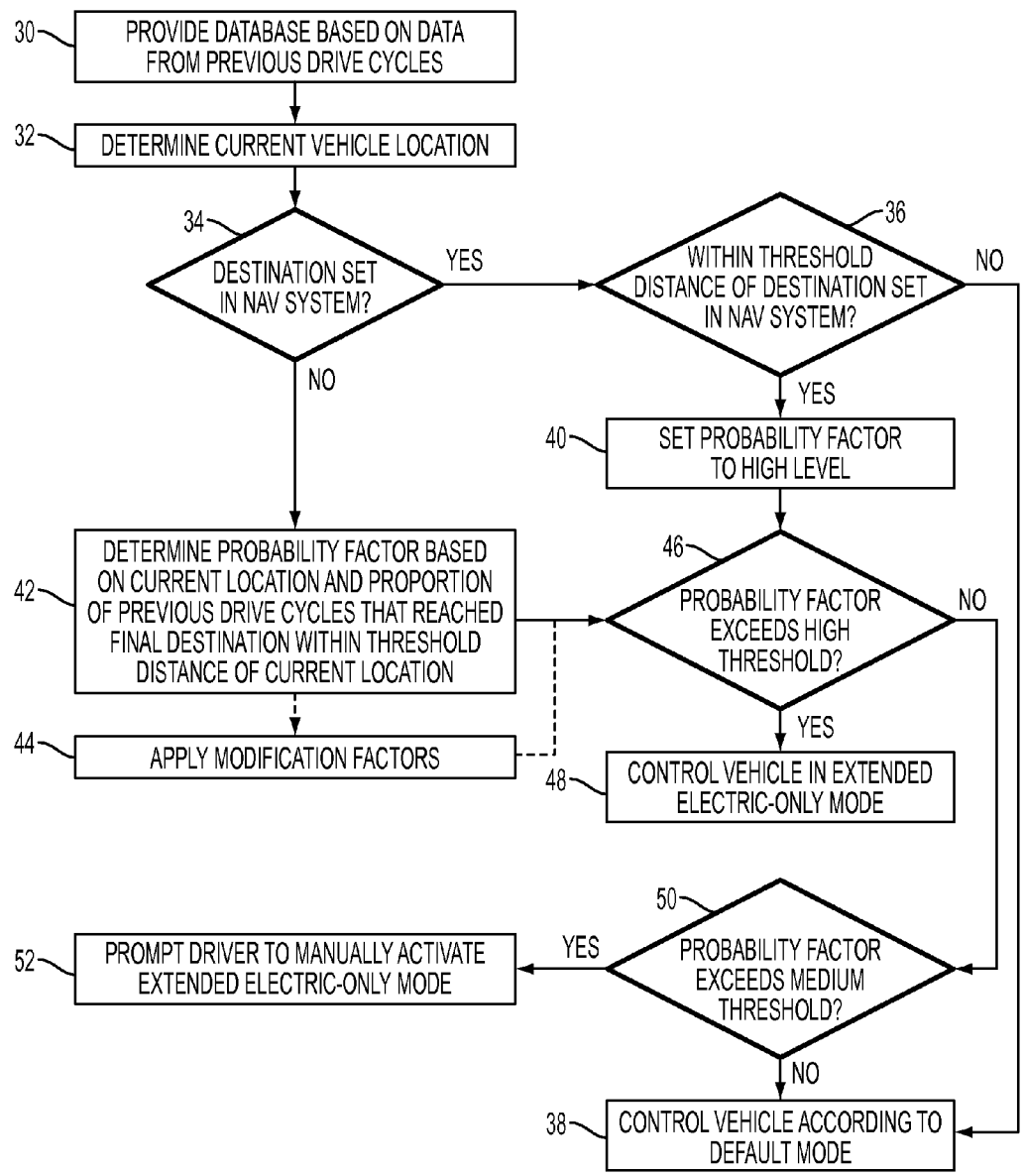
FIG. 2 is a flowchart illustrating a method according to an embodiment of the present disclosure.

Referring now to FIG. 2, a method of controlling a vehicle according to the present disclosure is shown in flowchart form.

The method begins by providing a vehicle with a database, as illustrated at block 30. The database is based on data from previous drive cycles collected from at least one vehicle. In a preferred embodiment, the database is based on data collected and aggregated from a plurality of vehicles, as will be discussed below with respect to FIG. 3. The database preferably includes probability factors associated with a plurality of potential vehicle locations, e.g. as a lookup table. The probability factor corresponds to a likelihood that a vehicle at a given location will reach its destination within a threshold distance. The probability may be evaluated based on the highest probability among multiple potential final destination locations within the threshold distance. The threshold distance may be, for example, one mile. Other appropriate thresholds may, of course, be used. Control then proceeds to block 32.

A current vehicle location is determined, as illustrated at block 32. This may be performed, for example, by detecting a current location using the navigation system 24. Control then proceeds to operation 34.

At operation 34, a determination is made of whether a destination for the current drive cycle has been designated in the vehicle navigation system. A destination may be designated by a vehicle operator prior to or during the current drive cycle, e.g. by interacting with a user interface of the navigation system.

If the determination of operation 34 is positive, i.e. a destination has been designated for the current drive cycle, control proceeds to operation 36. At operation 36, a determination is made of whether a current vehicle location is within a threshold distance of the destination designated in the navigation system. The threshold distance may be, for example, 1 mile. Other distances may be used as appropriate.

If the determination of operation 36 is negative, i.e. the current vehicle location is not within the threshold distance of the final destination, then the vehicle is controlled according to a default operating mode, as illustrated at block 38. The default operating mode may include operating in EV mode, or may include starting the vehicle engine in response to various parameters.

If the determination of operation 36 is positive, i.e. the current vehicle location is within the threshold distance of the final destination, then a probability factor is set to a high level, as illustrated at block 40. As discussed above, the probability factor corresponds to a probability that the vehicle is within the threshold distance of the final destination for the current drive cycle. As a non-limiting example, the high level may be 80%. Control then proceeds to operation 46, which will be discussed in further detail below.

Returning to operation 34, if the determination is negative, i.e. no destination has been designated for the current drive cycle, control proceeds to block 42. At block 42, a probability factor is determined based on a current vehicle location and based on the database of previous drive cycles. In embodiments making use of a lookup table, the determining involves looking up the current vehicle location in the table and obtaining the corresponding probability factor.

Optionally, at least one modification factor may then be applied to the probability factor, as illustrated at block 44. The at least one modification factor may increase or decrease the probability factor based on characteristics associated with a current drive cycle, the current vehicle location, or other appropriate parameters. In one embodiment, a first modification factor may be applied based on proximity to a vehicle charging location. The modification factor may be a constant value added to the probability factor, or a variable based on parameters such as the distance to the charging station. Such embodiments may be preferable when used in a PHEV. As an example, if the current vehicle location is near a charging station, the first modification factor may be applied to increase the probability factor determined in block 42, to account for an operators desire to charge the vehicle. In another embodiment, a second modification factor may be applied based on a starting location for a current drive cycle, as will be discussed below with respect to FIG. 4. In yet another embodiment, a third modification factor may be applied based on the vehicle entering a neighborhood, as will also be discussed below with respect to FIG. 4. Other appropriate modification factors may also be applied.

Control then proceeds to operation 46. At operation 46, a determination is made of whether the probability factor, as modified by any applicable modification factors, exceeds a first threshold. The first threshold corresponds to a relatively high probability. As a non-limiting example, the first threshold may be a 75% probability.

If the determination of operation 46 is positive, i.e. the probability factor exceeds the first threshold, then the vehicle is controlled in an extended electric-only mode, as illustrated at block 48. The extended electric-only mode may include, for example, inhibiting engine pull-ups based on climate factors, such as fluid temperatures. The extended electric-only mode may also include raising the power demand threshold at which an engine start is requested. In this fashion, unnecessary engine starts may be avoided as the vehicle nears the destination.

Returning to operation 46, if the determination is negative, i.e. the probability factor does not exceed the first threshold, control proceeds to operation 50. At operation 50, a determination is made of whether the probability factor exceeds a second threshold. The second threshold corresponds to a middling or medium probability. As a non-limiting example, the second threshold may be a 60% probability.

If the determination of operation 50 is positive, i.e. the probability factor exceeds the second threshold, then a driver alert is generated. The driver alert prompts a vehicle operator to manually activate the extended electric-only mode if desired. The driver alert may include an auditory or visual cue. The operator may activate the extended electric-only mode by, for example, selecting an appropriate option on a dashboard multi-function display. In this fashion, a driver may choose to engage the extended electric-only mode to avoid unnecessary engine starts near the destination, at the driver's discretion.

Returning to operation 50, if the determination is negative, i.e. the probability factor does not exceed the second threshold, then control proceeds to block 38 and the vehicle is controlled according to the default mode. In this fashion, if the likelihood that the vehicle is near its destination is low or indeterminable, the vehicle is controlled according to the default mode, which may generally be optimized for efficient operation under a variety of operating conditions.

Figure 3:
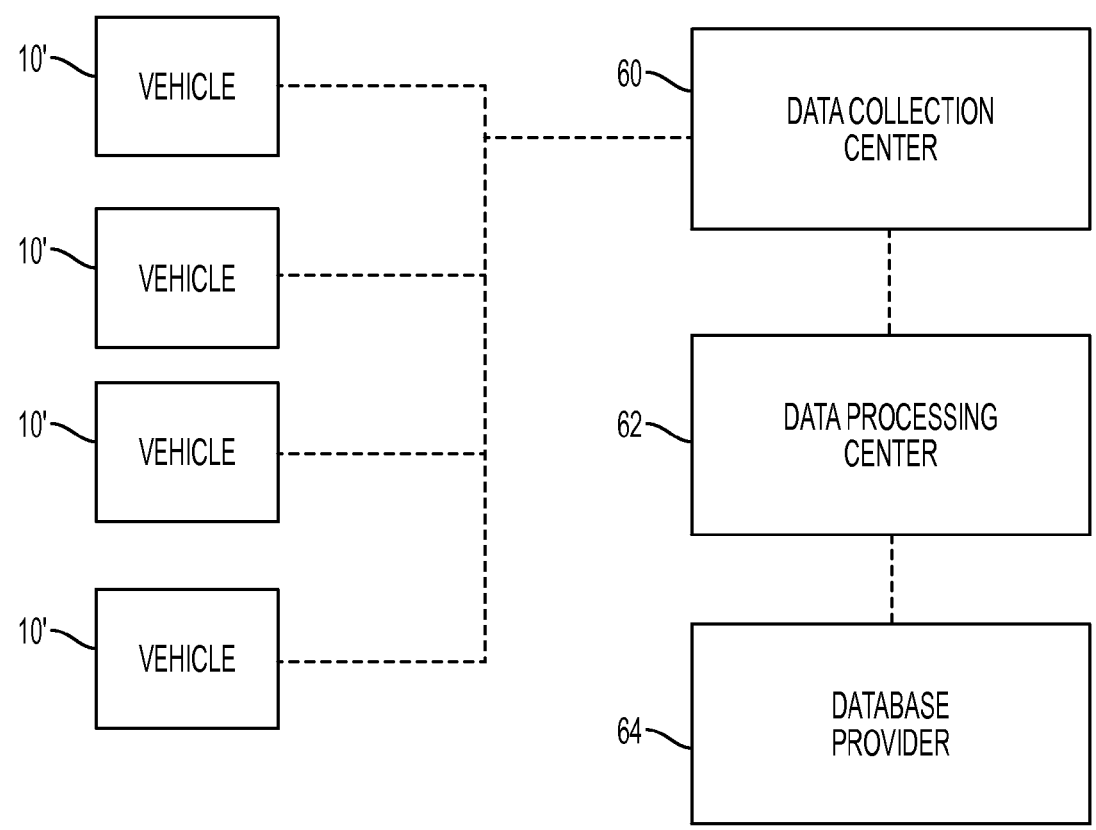
FIG. 3 illustrates a system for collecting and analyzing data from a plurality of vehicle drive cycles according to an embodiment of the present disclosure.

Referring now to FIG. 3, a system for generating trip data is illustrated in schematic form. A plurality of vehicles 10' are in communication with a data collection center 60. The vehicles 10' are configured to transmit sensor data to the data collection center 60, preferably including geolocation data. The data collection center 60 includes at least one computing device that is configured to aggregate the data. In a preferred embodiment, the aggregation includes "anonymizing" the data, or stripping the data of any data or metadata that could be used to identify the vehicle or driver from which the data was obtained.

The data collection center 60 communicates the aggregated data to a data processing center 62. The data processing center 62 includes at least one computing device that is configured to analyze the aggregated data. The analysis includes determining, for a given location, the proportion of vehicle drive cycles that reached a final destination within a threshold distance of the given location. By performing the analysis across a plurality of locations using the aggregated data, a database may be constructed to include a probability factor associated with each location. The probability factor corresponds to the probability that a vehicle at the associated location is within the threshold distance of a final destination for a current drive cycle.

The data processing center 62 communicates the database to a database provider 64. The database provider 64 may provide the database to vehicles for use in embodiments according to the present disclosure, such as the exemplary embodiment illustrated in FIG. 2. The database may be provided wirelessly, e.g. via a communication system 28 as shown in FIG. 1, via manual software updates, or other methods as known in the art.

In some embodiments, the data collection center 60, data processing center 62, and database provider 64 may be combined into a common processing center utilizing common computing devices. In other embodiments, they may be separate as illustrated in FIG. 3 or the functions may be split into a larger number of service providers.

Figure 4:
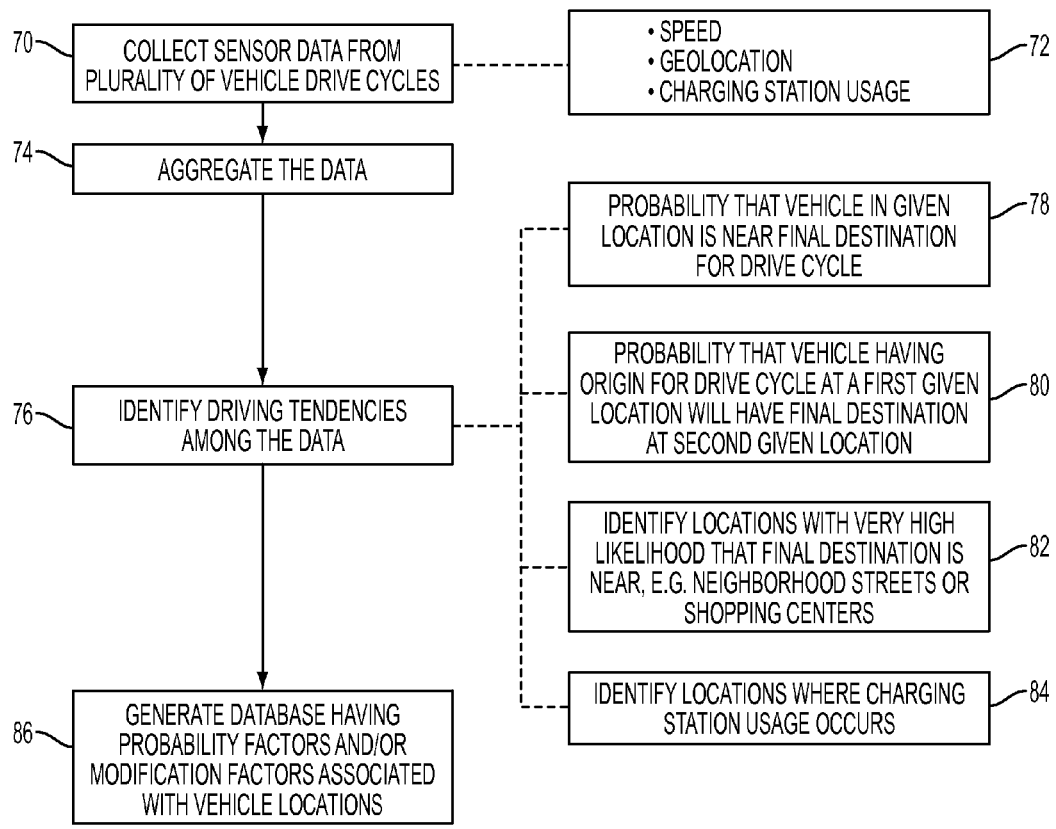
FIG. 4 is a flowchart illustrating a method of collecting and analyzing data from a plurality of vehicle drive cycles according to an embodiment of the present disclosure.

Referring now to FIG. 4, a flowchart illustrates a method for generating a database of probability factors and/or modification factors. Data from a plurality of drive cycles is collected, as illustrated at block 70. This sensor data may include a combination of speed data, geolocation data from a navigation system, electric vehicle charging station usage, and/or other appropriate parameters, as illustrated at block 72.

The collected data is aggregated and anonymized, as illustrated at block 74. The aggregated data is analyzed and driving tendencies among the aggregated data are identified, as illustrated at block 76.

As an example, and as illustrated at block 78, an analysis of the data collected and aggregated from multiple drive cycles from a plurality of vehicles may be used to determine the probability that a vehicle in any given location is near, e.g. within a threshold distance of, a final location for the current drive cycle.

As an additional example and as illustrated at block 80, an analysis of the data collected and aggregated from multiple drive cycles from a plurality of vehicles may indicate that a high number of drive cycles beginning in a particular location have a final destination in a particular area. This may be observed, for example, when residents of particular neighborhoods are highly likely to travel to a particular shopping or entertainment district.

As a further example and as illustrated at block 82, an analysis of the data collected and aggregated from multiple drive cycles may indicate certain locations having a very high likelihood that the final destination is nearby. Examples of such locations include when a vehicle enters a neighborhood and is thus highly likely to be approaching a house in the neighborhood, or when a vehicle enters a shopping center parking lot and is thus highly likely to park at the shopping center.

As yet another example and as illustrated at block 84, an analysis of the data collected and aggregated from multiple drive cycles may indicate locations where charging station usage occurs. Such information may be used to supplement databases of known charging stations.

A database is then generated based on the identified driving tendencies, as illustrated at block 86. The database may include probability factors associated with geographic locations based on the analysis in block 78, where the probability factor corresponds to the likelihood that a vehicle at a geographic location will reach the end of the current drive cycle within a threshold distance of the geographic location. The database may also include modification factors. The modification factors may be used to increase or decrease a probability factor for a given location based on other characteristics associated with a drive cycle or vehicle location. As non-limiting examples, a first modification factor may be provided based on the origin of a current drive cycle according to the analysis of block 80, a second modification factor may be provided based on locations with a very high likelihood that the final destination is near according to the analysis of block 82, and/or a third modification factor may be provided based on proximity to a charging station location according to the analysis of block 84.

As may be seen, the present disclosure provides a hybrid vehicle that may maintain electric-only mode operation and avoid engine starts while nearing a final destination for a drive cycle, even when the final destination is not a frequent destination for the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle comprising:
inhibiting engine starts by increasing a driver power engine-start threshold responsive to a calculated likelihood exceeding a threshold likelihood, the calculated likelihood being derived from geolocation data collected from geolocation systems in the vehicle and at least one other vehicle across a plurality of vehicle drive cycles and being a probability of the vehicle being within a threshold distance of a current drive cycle final destination.

2. The method of claim 1, further comprising inhibiting engine starts according to a temperature engine-start threshold of an engine component that is decreased in response to the calculated likelihood exceeding the threshold likelihood.

3. The method of claim 1 further comprising identifying a set of drive cycles among the plurality based on a current vehicle location, wherein the geolocation data for respective drive cycles of the set corresponds to the current vehicle location, and determining a proportion among the set for which drive cycles reached a final destination within the threshold distance to generate the calculated likelihood.

4. The method of claim 1 further comprising providing a modification factor based on a starting location for the current drive cycle to generate the calculated likelihood.

5. The method of claim 1 further comprising providing a modification factor based on a proximity to an electric vehicle charging station to generate the calculated likelihood.

6. The method of claim 1 further comprising providing a predetermined probability factor based on a vehicle destination being set in a vehicle navigation system to generate the calculated likelihood.

7. The method of claim 1 further comprising providing a modification factor based on a detected current vehicle location on a neighborhood road to generate the calculated likelihood.

8. A vehicle comprising:
an electric drive system including a traction battery;
an internal combustion engine; and
a controller configured to control an electric-only operating mode of the vehicle according to a driver power request and associated first engine-start threshold responsive to a calculated likelihood exceeding a threshold likelihood, and control the electric-only operating mode according to the driver power request and associated second engine-start threshold different than the first engine-start threshold otherwise, the calculated likelihood being derived from geolocation data collected from geolocation systems in the vehicle and at least one other vehicle across a plurality of vehicle drive cycles and being a probability that the vehicle is within a threshold distance of a final destination for a current drive cycle.

9. The vehicle of claim 8, wherein the first engine-start threshold is greater than the second engine-start threshold.

10. The vehicle of claim 8, wherein the controller is further configured to control electric-only mode according to a third engine-start threshold associated with a temperature of an engine component in response to the calculated likelihood exceeding the threshold likelihood and otherwise control the electric-only operating mode according to a fourth engine-start threshold associated with the temperature that is less than the third engine-start threshold.

11. The vehicle of claim 8, wherein the controller is further configured to control the electric-only mode according to a fifth engine-start threshold associated with a traction battery state of charge in response to the calculated likelihood exceeding the threshold likelihood and otherwise control the electric-only operating mode according to a sixth engine-start threshold associated with the traction battery state of charge that is less than the fifth engine-start threshold.

12. A method of controlling a vehicle, comprising:
modifying, responsive to an electric drive mode being active and a calculated probability exceeding a threshold, an engine-start threshold associated with an engine temperature, the calculated probability being that the vehicle is within a threshold distance of a final destination for a current drive cycle and derived from geolocation data collected from the vehicle and at least one other vehicle across a plurality of drive cycles; and
operating an engine according to the engine-start threshold.

13. The method of claim 12, wherein the calculated probability is based on an identified set of drive cycles among the plurality that is based on a current vehicle location, on the geolocation data for respective drive cycles of the set corresponding to the current vehicle location, and on a determined proportion among the set for which the drive cycles reached a final destination within the threshold distance.

14. The method of claim 12, wherein the calculated probability includes a modification factor based on a starting location for the current drive cycle, on a proximity to an electric vehicle charging station, on a vehicle destination being set in a vehicle navigation system, or on a detected current vehicle location on a neighborhood road.

* * * * *